(12) United States Patent
Russell-Clarke

(10) Patent No.: US 9,139,923 B2
(45) Date of Patent: Sep. 22, 2015

(54) ELECTROFORMED HOUSINGS FOR DEVICES AND METHODS FOR MAKING THE SAME

(71) Applicant: Apple Inc., Cupertino, CA (US)

(72) Inventor: Peter N. Russell-Clarke, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 228 days.

(21) Appl. No.: 13/708,597

(22) Filed: Dec. 7, 2012

(65) Prior Publication Data

US 2014/0159927 A1    Jun. 12, 2014

(51) Int. Cl.
*G06F 3/01* (2006.01)
*C25D 1/02* (2006.01)
*G06F 1/18* (2006.01)
*G06F 3/02* (2006.01)

(52) U.S. Cl.
CPC *C25D 1/02* (2013.01); *G06F 1/182* (2013.01); *G06F 3/0202* (2013.01); *Y10T 29/4998* (2015.01)

(58) Field of Classification Search
USPC .............................................. 205/67
See application file for complete search history.

(56) References Cited

U.S. PATENT DOCUMENTS

| | | | | |
|---|---|---|---|---|
| 3,170,046 A | * | 2/1965 | Leale | 381/328 |
| 3,314,130 A | * | 4/1967 | Sheridan | 29/600 |
| 3,439,231 A | * | 4/1969 | Booe | 361/536 |
| 2002/0032362 A1 | * | 3/2002 | Juneau et al. | 600/25 |

* cited by examiner

*Primary Examiner* — Keith Hendricks
*Assistant Examiner* — Stefanie S Wittenberg
(74) *Attorney, Agent, or Firm* — Downey Brand LLP

(57) ABSTRACT

Electroformed housings for electronic devices and methods for making the same are provided. An electronic device is provided having circuitry with interface circuitry for processing a user input event, and an electroformed housing that is an enclosure for the circuitry, the electroformed housing having a user interface region positioned adjacent to the interface circuitry such that when a user initiates a user input event on the user interface region, the interface circuitry processes the user input event.

17 Claims, 11 Drawing Sheets

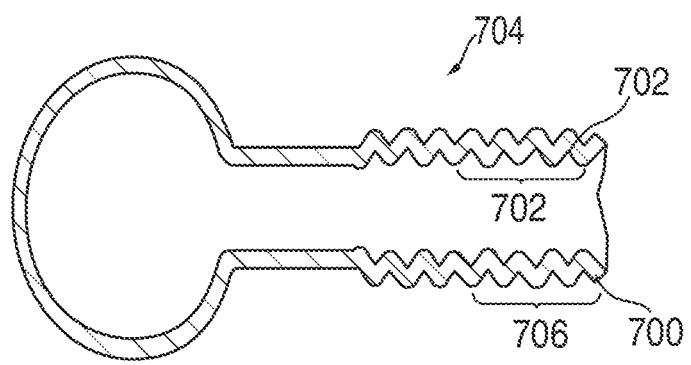
FIG. 7
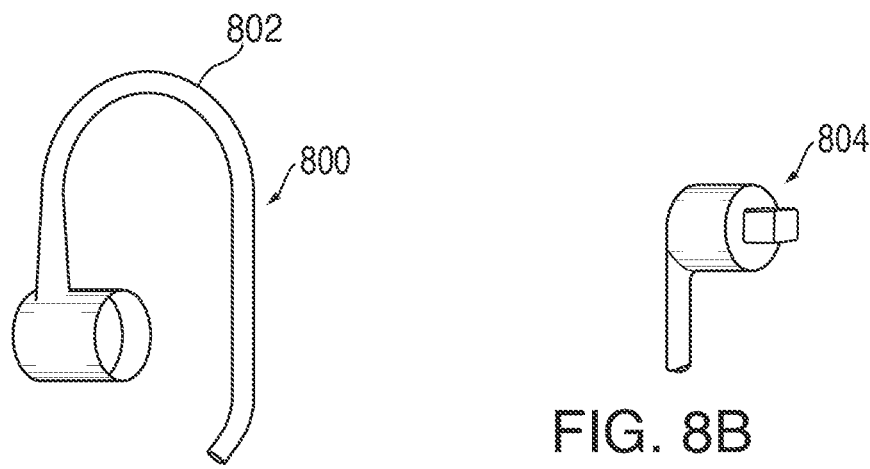
FIG. 8A
FIG. 8B
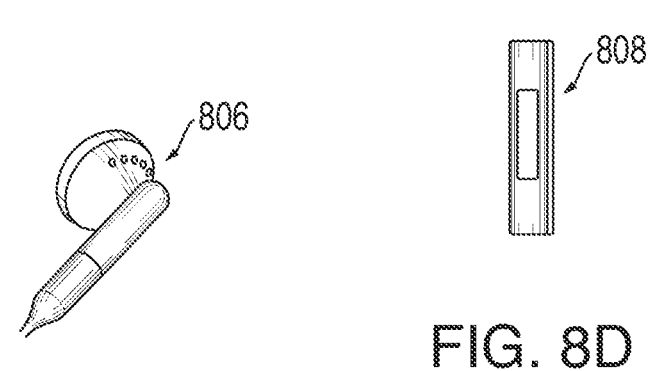
FIG. 8C
FIG. 8D

ELECTROFORMED HOUSINGS FOR DEVICES AND METHODS FOR MAKING THE SAME

BACKGROUND

Electronic devices include a housing for enclosing or securing various device components and circuitry. The characteristics of housings vary from device to device. For example, housings for computers, phones, and keyboards are generally different, and may be constructed using different materials and assembly techniques. Despite the variation in construction, many conventional housing are generally formed from two or more housing parts that are fixed together. The use of multiple housing parts typically requires that the housing parts be designed to be fixed to each other to secure electronic components in place. This can result in seams or other non-aesthetic blemishes at the junction between housing parts. Accordingly, housings for electronic devices that are aesthetically pleasing and substantially one piece constructions are needed.

SUMMARY

Electroformed housings for electronic devices and methods for making the same are provided. In some embodiments, an electronic device is provided. The electronic device having circuitry with interface circuitry for processing a user input event, and an electroformed housing that is an enclosure for the circuitry, the electroformed housing having a user interface region positioned adjacent to the interface circuitry such that when a user initiates a user input event on the user interface region, the interface circuitry processes the user input event.

In other embodiments, a keyboard is provided. The keyboard having keyboard electronics, and an electroformed metal structure that encloses the keyboard electronics, the electroformed metal structure being a self-supporting structure having a substantially uniform thickness.

In yet other embodiments, a method for making an electroformed housing for an electronic device is provided. The method provides encapsulating interface circuitry in a material to form a mandrel, the mandrel encompasses the interface circuitry and has a first shape, electroforming a metal layer around the mandrel to form the electroformed housing with a user interface region, the electroformed housing encompasses the mandrel and has a second shape that resembles the first shape, and removing at least a portion of the mandrel from the electroformed housing such that, after the portion of the mandrel is removed, the interface circuitry is retained within the electroformed housing in a position adjacent to the user interface region and the electroformed housing retains the second shape.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 7 shows an illustrative cross-sectional view of a mandrel and an electroformed housing in accordance with an example of an embodiment of the invention;

FIG. 8A shows an illustrative isometric view of an electroformed housings in accordance with embodiments of the invention;

FIG. 8B shows an illustrative isometric view of an electroformed housings in accordance with embodiments of the invention;

FIG. 8C shows an illustrative isometric view of an electroformed housings in accordance with embodiments of the invention;

FIG. 8D shows an illustrative isometric view of an electroformed housings in accordance with embodiments of the invention;

DETAILED DESCRIPTION OF THE DISCLOSURE

Figure 1A:
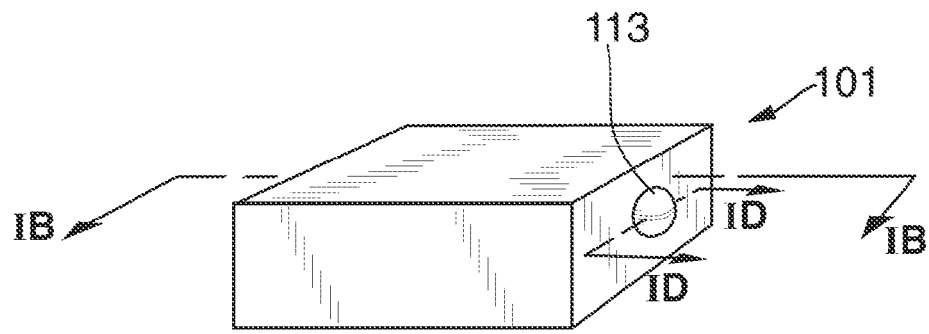
FIG. 1A shows an illustrative view of an electroformed housing in accordance with some embodiments of the invention.

Electroformed housings for an electronic device and methods for making the same are disclosed. Electroformed housings according to embodiments of the invention enclose electronic parts in a manner that is both aesthetically pleasing and ensures enclosed electronic parts are functional for a device.

An electroformed housing is an electroformed metal structure created using an electroforming metal deposition process. The use of the electroforming metal deposition process allows for creation of a resulting electroformed housing that can be a unitary or single-piece metal structure that substantially encloses or surrounds the electronic parts of a device. The electroformed housing may be unitary in that it does not require two or more housing components to be fixed together to form the housing to enclose electronic parts for a device. The unitary structure of the resulting electroformed housing can provide desired aesthetics because no housing component junctions or seams exist to enclose electronic parts of a device.

The electroformed housing is created by first encapsulating electronic parts and/or circuitry in a material to form a mandrel. The mandrel may be any desired three dimensional shape that defines the shape of a resulting electroformed housing for a device. The mandrel (and enclosed circuitry and/or parts) is subjected to an electroforming metal deposition process that deposits a material around the mandrel to form the electroformed metal structure of the housing. In the electroforming process, layers of the metal may be deposited onto the mandrel via a chemical bath. In some embodiments, surfaces of the mandrel intended to be used for creation of the resulting housing may be created from a conductive material and/or pretreated to ensure surfaces of the mandrel are conductive. During the electroforming process, metal layers may be deposited onto conductive surfaces of the mandrel. The metal is deposited with a sufficient number of layers and/or thickness to create a self-supporting structure such that even if the entire mandrel or a portion of the mandrel is removed, the resulting electroformed metal structure remains intact.

Removal processes for the mandrel may depend on the material used to create the mandrel. Mandrels may be created from a conductive material, a material treated to be conductive, any type of plastic, any type of metal (e.g., aluminum), any other suitable material, and/or combination of materials that can be shaped as desired to make a resulting electroformed housing. One or more drainage holes may be created in electroformed housing allowing the mandrel to flow out of the electroformed housing to at least partially remove the mandrel. The mandrel may be removed by heating the electroformed housing to a predetermined temperature to cause the mandrel material, such as plastic, to flow out of one or more drainage holes in electroformed housing. In other embodiments, an acid bath or other chemicals may be used to remove or etch away at the mandrel material, such as aluminum. In some embodiments, multiple materials may be used to create the mandrel and each material used to create the mandrel may be selectively removed as desired. For example, a first portion of the mandrel formed from a first material (e.g., plastic) may be removed using a particular removal method (e.g., heated to a particular temperature) while a second portion of the mandrel formed from a second material (e.g., a metal or plastic with a different melting point) remains intact. Drainage holes may be strategically placed in electroformed housing to ensure mandrel can flow out of the electroformed housing.

In some embodiments, holes in electroformed housing may serve a dual purpose as a drainage hole and a functional port for the device. Any number of ports can be created in electroformed housing for device including, but not limited to, a connector port, a port through which a cable or wire can pass through, or a sound port through which sound waves can pass. Drainage holes and ports may be strategically placed in electroformed housings to ensure that mandrel material is entirely removed and/or removed from particular electronic parts.

In embodiments where the mandrel is removed, the electroformed metal structure may be constructed to have one or more retaining structures that secure the electronic parts in place. For example, the mandrel may be shaped in such a way that when the metal is deposited thereon, the resulting metal structure forms a self-locking retaining mechanism for an electronic part and the electronic part may remain in place, when the mandrel is removed. The retaining structures may ensure that the electronic parts remain in particular positions within the housing to be functional for the device.

The electroformed housing can be used for any suitable number of different devices. For example, the electroformed housing may be a housing for earbuds, headphones, and the like. In another example, the electroformed housing may be a housing for a keyboard or other user input device. In yet another example, the electroformed housing may be an aesthetically pleasing housing for a portable media device, such as a small form factor media player.

FIG. 1A shows an illustrative view of an electroformed housing in accordance with some embodiments of the invention. FIG. 1A shows electroformed housing 101 for device constructed from a metal using an electroforming process. Electroformed housing 101 may be a one-piece, unitary, or unibody metal shell with an interior space for one or more electronic parts. Electroformed housing 101 may substantially surround electronic parts for a device, such that less housing parts are fastened together to form the device housing, and as a result, there are less seams visible on the housing for the device. For example, electroformed housing 101 may serve as the main housing for a device and only user interface components, such as buttons, to control interface circuitry of device may be attached.

Electronic parts enclosed by electroformed housing 101 may provide device circuitry for a particular device or a particular function of a device. By way of example, electroformed housing 101 may be a one-piece housing enclosing electronic parts for a computer. In another example, electroformed housing 101 may be a single housing for a peripheral device, such as a display or a keyboard. Electronic device may have a single function or multiple functions. Although shown as a generic box in FIG. 1A, electroformed housing 101 may be a housing for any type of device, including, but not limited to, the following: earphones, media players, video players, still image players, game players, music recorders, voice recorders, cameras, radios, medical equipment, domestic appliances, vehicle instruments, musical instruments, calculators, cellphones, wireless communication devices, personal digital assistants, programmable remotes, pagers, laptops, computers, printers, and/or any combination thereof.

Electroformed housing 101 may enclose electronic parts for a device, including, but not limited to: a processor, a storage device, a circuit board, communications circuitry, interface circuitry, a bus, system on a chip (SOC), application specific integrated circuits (ASIC), and/or a power supply. The bus can provide a data transfer path for transferring data to/from elements of device. The processor or any other component that can execute instructions can control functions of the device and other circuitry. For example, processor can receive user inputs that drive output.

Storage device can include one or more storage mediums, including, for example, a hard drive, a permanent memory, such as ROM, a semi-permanent memory, such as RAM, and/or a cache that can store data. Data can include, but is not limited to, the following: media, software, configuration information, and/or any other type of data.

Communications circuitry can include circuitry for wireless communication (e.g. short and long range communication). For example, the wireless communication circuitry of device can be Wi-Fi enabling circuitry that permits wireless communication according to one of the 802.11 standards. Other standards can be supported, such as Bluetooth®. Communication circuitry can include circuitry that enables device to be coupled to another device and communication with that other device. Additional electrical components can be provided for sending and receiving media, including, but not limited to, microphones, amplifiers, digital signal processors, image sensors, optics, antennas, receivers, transmitters, transceivers, and the like.

Electroformed housing 101 may have at least one user interface region 113 that allows a user to interact with the device. User interface region 113 may include output components (although not shown) and/or input components or controls. Embodiments of electroformed housing 101 may allow for connecting user interface components or user interface controls directly to the electroformed housing. For example, electroformed housing 101 can include one or more user interface components, including, but not limited to, the following: switches, sliding switches, keypads, dials, scroll wheels, touch screen displays, electronics for accepting audio, and/or visual information, antennas, infrared ports, or combinations thereof.

In certain embodiments, each of the one or more input components of device can be configured to trigger execution of instructions to provide device functionality. For example, an input component can provide one or more dedicated control functions for making selections or issuing commands associated with operating device. Continuing with the example, in the case of a media player, an input component can be associated with powering up or down the device, opening or closing a menu, playing or stopping a song, changing a mode, and/or the like.

In one or more embodiments, electroformed housing 101 may have user interface region 113 with an input component or user interface control that is integrated or incorporated in to the electroformed housing 101. For example, a button may be formed on the surface of metal structure for electroformed housing 101. Electroformed housing 101 may have interface circuitry for processing user inputs events initiated with user interface components or controls. Interface circuitry may be positioned substantially adjacent to a user interface region 113, such that user input events can be processed when a user interacts with the user interface.

Electroformed housing 101 may have openings, indentations, ports, and/or connections 106 for attaching additional components (connections 106 are discussed in more detail below), electronic parts, and/or housings for a particular function or device to the housing 101. Certain embodiments of electroformed housing 101 can include at least one output component attached to electroformed housing 101 that provides the user with information, sound, and/or a display of information. Output components can take various forms including, but not limited to, the following: audio speakers, headphones, audio line-outs, visual displays, antennas, infrared ports, ports, or the like.

Electroformed housing 101 may have exterior retention features to allow for attaching additional electronic parts, components, and/or housings to electroformed housing, such as a display screen. For example, electroformed housing 101 may be shaped to provide exterior retention features for securing or attaching a display screen or housing for a display screen. In an embodiment, display screen may be a touch screen that receives input through a user's touch to the screen.

Figure 1B:
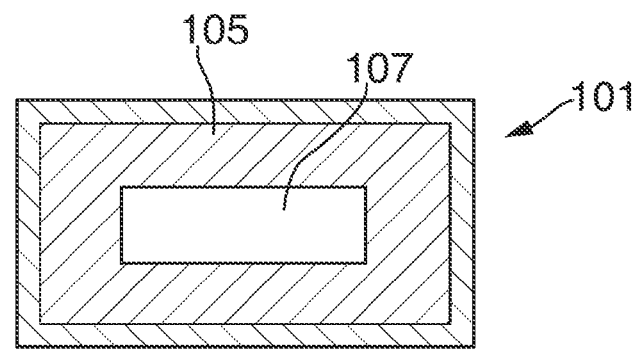
FIG. 1B shows an illustrative cross-sectional view of an electroformed housing in FIG. 1A taken along line IB-IB in accordance with some embodiments of the invention.

FIG. 1B shows an illustrative cross-sectional view of an electroformed housing in FIG. 1A taken along line IB-IB in accordance with some embodiments of the invention. FIG. 1B shows an electroformed housing 101 for a device with a mandrel 105. Mandrel 105 may encapsulate device electronics 107 (e.g., electronic parts) in a material. For example, electronic parts may be potted in a plastic resin within mandrel 105.

Mandrel 105 may define a shape for creation of resulting electroformed housing 101 using an electroforming process. Resulting electroformed housing 101 may take a shape resembling mandrel 105 or a shape substantially similar to mandrel 105. Mandrel 105 may be shaped to form a single housing that substantially encloses one or more electronic parts for a device or a set of electronic parts that perform a particular function for a device. Mandrel 105 may be created with a desired shape by being molded, formed, machined, and/or processed. Mandrel 105 may have a shape to create a particular shaped housing 101 in accordance with the intended function of the device. For example, mandrel 105 may be shaped to create an earbud, a phone, or any other device.

Mandrel 105 for the device may be shaped to create housing 101 that is aesthetically pleasing and accommodates the electronics contained within. For example, housing 101 may enclose one or more electronic parts for a computer, such that an additional housing is unnecessary for covering or enclosing the electronic parts of the computer or electronic parts providing a particular function of the computer. In this way, the resulting device housing may ultimately have fewer seams and have a more aesthetically pleasing appearance.

A unitary housing with less seams on the housing may additionally be more comfortable for the user to wear against their body. For example, the seams on earbud housings may be jagged and uneven such that the seams may be uncomfortable when placed next to the ear. As such, an earbud housing with less seams may be smooth and less irritating for the user to wear next to the ear.

Mandrel 105 and resulting device or housing 101 created with mandrel 105 may be a three dimensional shape that is rectilinear or non-rectilinear. As shown in FIG. 1A, the resulting electroformed housing 101 can have a substantially hexahedral shape. Although, it should be noted that electroformed housing 101 is only exemplary and need not be substantially hexahedral. Housing 101 can be formed in any other shape, including, but not limited to, the following: spherical, ellipsoidal, conoidal, octahedral, or any combination thereof.

Mandrel 105 may have retention forming features to create retention features that ensure electronics are retained in a particular place within the housing and/or the device electronics perform optimally. For example, mandrel may be created with retention features to secure circuitry in a particular position. Continuing with the example, mandrel 105 may be created with retention features to retain interface circuitry substantially adjacent to a user interface region 113. In another example, retention features may keep electronic parts in place so as not to obstruct a port of device, such as a sound port.

Mandrel 105 may have connection forming features to ensure that housing 101 electrically connects to the electronics within. Connection forming features may form a connection or a contact area to allow for integrating a user interface control and/or accommodating attachment of a control to housing 101 for the electronic part or device circuitry.

In some embodiments, mandrel 105 may have user interface forming features to create a user interface, such as a button, on the surface of resulting electroformed housing 101. Mandrel 105 may be shaped such that the application of layers of metal during the electroforming process on user interface forming feature create a metal button that is integrated (e.g., on the surface of electroformed housing 101) in to electroformed housing 101. For example, it may be desirable to create a button on the surface of electroformed housing 101 as opposed to attaching a user interface component above a contact area on electroformed housing 101.

Figure 1C:
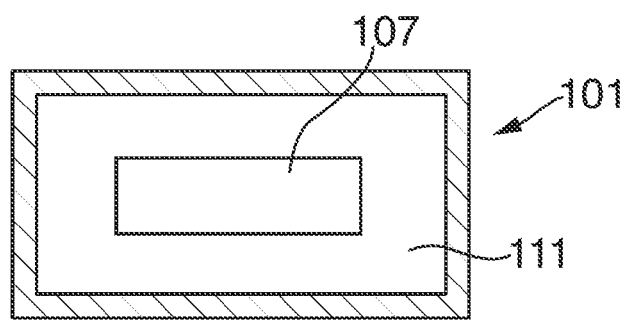
FIG. 1C shows an illustrative cross-sectional view of an electroformed housing in FIG. 1A taken along line IB-IB in accordance with some embodiments of the invention.

FIG. 1C shows an illustrative cross-sectional view of an electroformed housing in FIG. 1A taken along line IB-IB in accordance with some embodiments of the invention. Electroformed housing 101 may be a self-supporting structure without mandrel 105. At least a portion of the material for mandrel 105 may be removed from region 111 of electroformed housing 101. FIG. 1C shows an electroformed housing 101 for a device with a region 111 with no mandrel 105. As shown in FIG. 1C, a substantial amount of mandrel 105 may be removed or drained from electroformed housing 101 and the shape of electroformed housing 101 may remain intact. In an embodiment, portions of mandrel 105 may remain within housing 101 to cushion a particular electronic part, ensure that an electronic part remains in place, form a barrier between particular electronic parts, and/or any other reason for keeping portions of the mandrel within the device.

Retention features may ensure that electronic parts remain in place after removal of a material used for mandrel 105. For example, retention features may ensure that a fan remains in particular position and is secured such that the fan does not shake and make excessive noise, or otherwise interfere with operation of other electronics. Continuing with the example, retention features may ensure that particular electronic parts that generate heat remain secured in place and do not cause the device to overheat or destroy another electronic part within the device. In another example, retention features may ensure that circuitry remains in place to allow for user interaction with the device circuitry, such as user interface components.

Figure 1D:
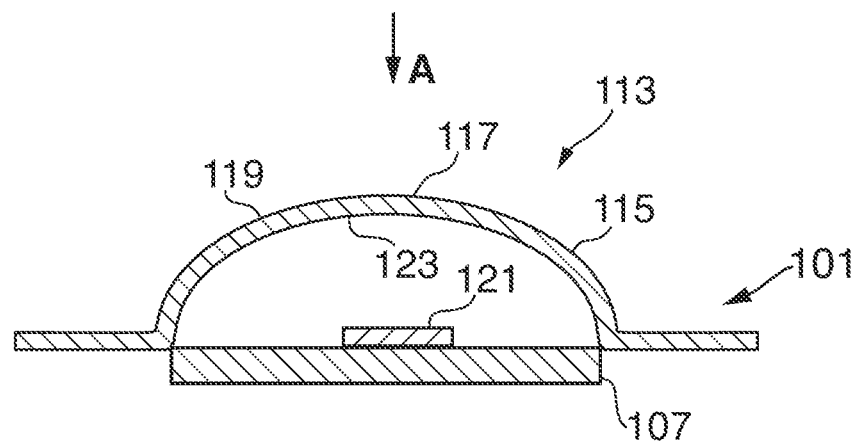
FIG. 1D shows an illustrative view of a cross-sectional view of user interface region 113 for the device with the housing of the device taken across line ID-ID of FIG. 1A in accordance with embodiments of the invention.

FIG. 1D shows an illustrative view of a cross-sectional view of user interface region 113 for the device with the housing of the device taken across line ID-ID of FIG. 1A in accordance with embodiments of the invention. FIG. 1D shows user interface 115 in user interface region 113 of housing 101 with an interface component (e.g., an interface control, an LED to visually provide device status, or any other interface component) integrated in to electroformed housing 101. A user can initiate an input event by interacting with the user interface 115 on electroformed housing 101. For example, user interface 115 may be a button, a dome switch or any other type of user interface component having a top surface 117 of an actuator 119 that may be depressed or deformed to close an otherwise open circuit of device, or to open an otherwise closed circuit.

At rest, electrical contact area 121 of user interface 115 is separated from conductive inner surface 123 and switch is said to be electrically "open." When actuator 119 is compressed to a point where it deforms, opposing conductive inner surface 123 of switch may be moved to be in physical and electrical contact with opposing contact area 121 to complete an electrical circuit, and the contact is said to electrically "close" the switch. Contact area 121 may be coupled to electronic part 107, such as a circuit board for interface circuitry of device. In this example, when the switch is closed, at least one circuit of circuit board 107 is completed and the user input event processing may begin with interface circuitry.

Figure 1E:
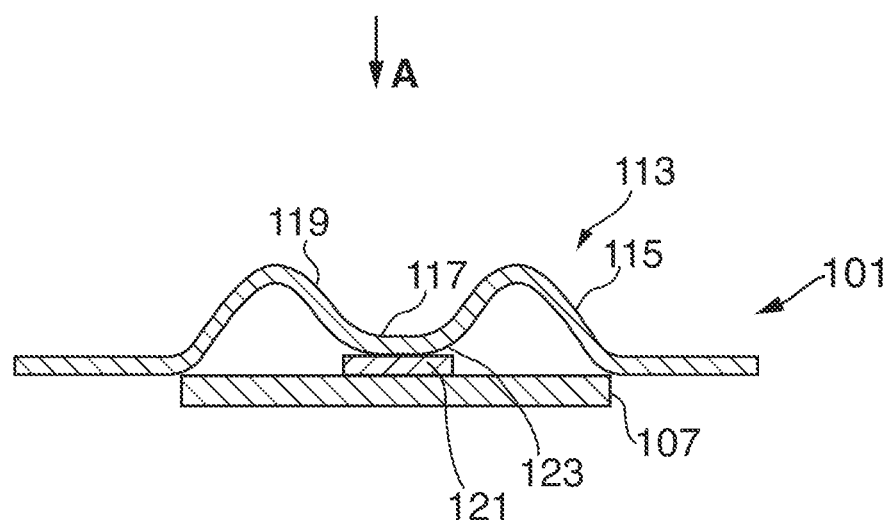
FIG. 1E shows an illustrative view of a cross section view of user interface region 113 for the device with the housing of the device taken across line ID-ID of FIG. 1A in accordance with embodiments of the invention.

FIG. 1E shows an illustrative view of a cross section view of user interface region 113 for the device with the housing of the device taken across line ID-ID of FIG. 1A in accordance with embodiments of the invention. In this example, the user can initiate an input event by exerting force on top surface 117 of actuator 119 of user interface 115. Force in direction A applied to top surface 117 may depress or deform actuator 119 of user interface 115 from an original position to an actuated position to change a functional state of device, such as to turn device off or on.

As shown, actuator 119 is compressed to a point where it deforms, opposing conductive inner surface 123 of switch is moved to be in physical and electrical contact with opposing contact area 121 to complete at least one electrical circuit on circuit board 107, and the contact is said to electrically "close" the switch. Actuator 119 may be dome shaped, conical shaped, and/or have any other shape that can be deformed to move contact areas closer together and return to an original position. When a user terminates the force at top surface 117, actuator 119 may return to its original position as shown in FIG. 1D.

Figure 1F:
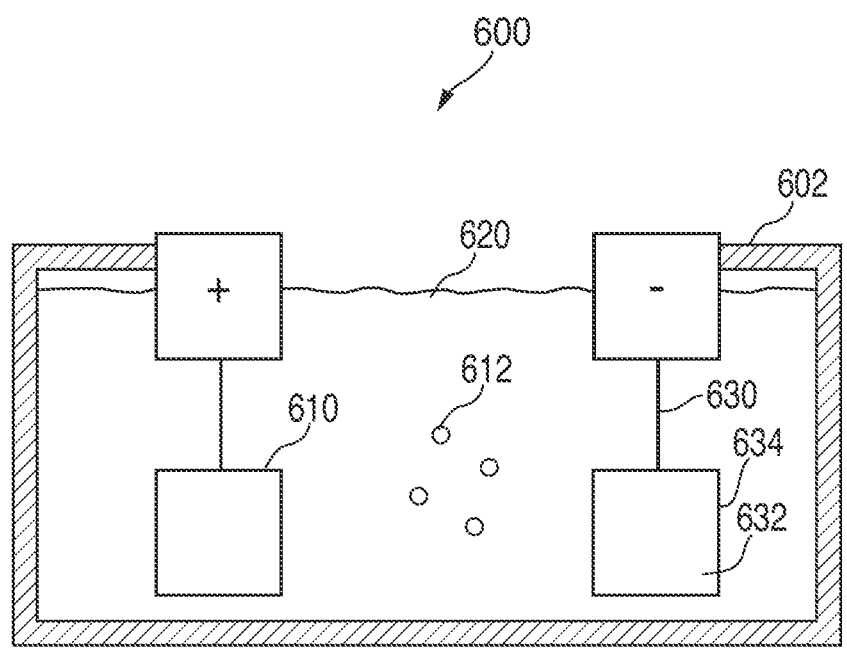
FIG. 1F is a schematic view of an illustrative electroforming process in accordance with some embodiments of the invention.

FIG. 1F is a schematic view of an illustrative electroforming process in accordance with some embodiments of the invention. Process 600 is used to form a housing that is self-supporting when mandrel 105 is removed. Mandrel 105 provides a support structure for three dimensional shaped housing 100 during the electroforming process. In an electroforming process, material 612 from anode 610 is moved in bath 620 towards mandrel 632, such as mandrel 105, forming cathode 630 when electric current 602 is applied between anode 610 and cathode 630. Material 612 may be deposited as a thin layer 634 on a surface of mandrel 632 and/or an electronic part exposed with a hole or an opening in the mandrel 632.

Any suitable material can be used as anode 610 to be deposited on mandrel 632. In some cases, anode 610 can include a nickel-based metal or alloy such that nickel is the primary material deposited on mandrel 632. In addition, any suitable material can be used for mandrel 632. In particular, the material can be selected such that mandrel 632 can be easily removed when layer 634 is sufficiently thick to be self-supporting. For example, mandrel 632 can be constructed from a plastic resin. As another example, mandrel 632 can be constructed from a non-conductive material that has a conductive coating. As still another example, mandrel 632 can be constructed from aluminum or other suitable metal.

The electroforming process can have several advantages or benefits in constructing electroformed housings. For example, the exact composition of the material deposited on the mandrel can be known and controlled by choosing the material for anode 610. In particular, it may be possible to ensure that a high percentage of the material deposited on mandrel 632 is pure nickel. For example, the nickel purity of layer 634 may be larger than 95%, larger than 98%, larger than 99%, larger than 99.5%, larger than 99.8%, or larger than 99.9%. By providing a very pure electroformed housing, or at least an electroformed housing having a known chemical composition, alloy variations in the component may be reduced and the mechanical response of the component can be easily predicted and calculated based on the mechanical properties of the chemical composition.

Another related benefit can include knowing the mechanical and material properties of an electroformed housing. In particular, the grain of the material may not include any unexpected or undesired discontinuities or singularities. As still another benefit, the electroformed housing may not include any stresses or strains caused by a manufacturing process. The resulting electroformed housing will therefore react in a manner that is predictable and can be easily calculated using classical mechanics, quantum mechanics, finite element analysis, or any other analytical means. This approach enables engineers to rationally design earbuds to have particular mechanical properties, and to produce earbuds that behave as designed.

Still another benefit of an electroforming process can include a high degree of precision in the thickness of the electroformed housing. In particular, by virtue of the bath, material from the anode is evenly deposited on the mandrel. The particular thickness of the deposited material is determined, for example, from the amount of current applied between the anode and the cathode, chemical properties of the bath, chemical properties of the anode and cathode, the amount of time that the mandrel is left in the bath, the amount of time that current is applied between the anode and the cathode, or combinations of these. These factors, however, can be easily controlled and repeated between batches to ensure that all electroformed housings have substantially the same thickness. Electroformed housings can have any suitable thickness including, for example, a thickness in the range of 15 to 800 microns, 15 to 500 microns, 15 to 100 microns, 15 to 50 microns, 15 to 30 microns, or 15 to 20 microns.

In addition, because the nickel or other material is deposited atom by atom in a tightly controlled chemical and physical environment, variations in the thickness of the deposited material can be tightly controlled. For example, the tolerance for deposited material can be +/−1500 nanometers, +/−1000 nanometers, +/−500 nanometers, +/−200 nanometers, +/−100 nanometers, +/−50 nanometers, +/−30 nanometers, or +/−10 nanometers. In addition, this may enable the deposition of additional material in specific regions of, for example to create a nub or a texture. For example, portions of the housing can be masked, and additional material can be deposited over the mask such that when the mask is removed, the housing has additional material defining a particular texture in specific regions.

A further benefit of the electroforming process may be the use of nickel for the housing. Nickel can have a much higher tensile strength than some stainless steel alloys (e.g., 500 MPa for steel, but 2000 MPa for nickel), and therefore can potentially produce a more reliable part.

Figure 2A:
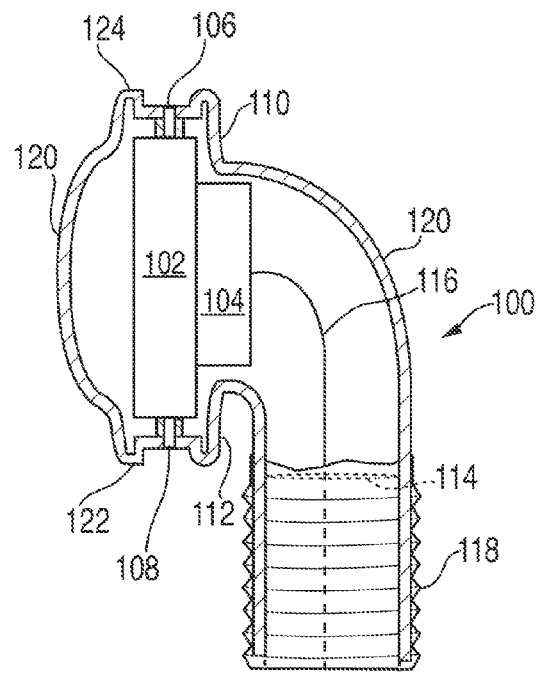
FIG. 2A shows an illustrative cross-sectional view of an electroformed housing in accordance with embodiments of the invention.

FIG. 2A shows an illustrative cross-sectional view of an electroformed housing in accordance with embodiments of the invention. Electroformed housing 100 may be a three dimensional shaped structure having one or more electronic parts, such as 102 and 104 contained therein. The outer surface 120 of housing 100 may be an electroplated metal. Embodiments of housing 100 may be created as one piece or a plurality of pieces that are coupled to form housing 100. For example, an electroformed earbud piece that encloses earbud electronics may be coupled to an articulated region 118 piece that encloses a cable or a wire 116 to form housing 100.

Three dimensional shaped housing 100 may be any shape that accommodates and/or substantially encloses one or more electronic parts, such as 102 and 104. Three dimensional shaped housing 100 may have a shape that allows one or more electronic parts to be used to perform a particular function and/or is aesthetically pleasing. For example, three dimensional shaped housing 100 may be shaped to enable three dimensional shaped housing 100 to be used or function as an earbud and/or an earbud component. Housing 100 may be shaped to fit just within an ear canal or rest within the ear.

Housing 100 may have a shape that positions one or more electronic parts (e.g., 102 and 104) for optimal use, performance, and/or intended functionality. For example, housing 100 may have a shape that positions electronic parts and/or ports in relation to the ear for optimal sound quality when the earbud is on the ear. Housing 100 may be used for a particular function and/or have an aesthetically pleasing shape. For example, housing 100 may be formed to accommodate a driver for an earbud as well as have a smooth shape with no jagged edges to fit comfortably next to the ear.

Earbuds may have occluding or non-occluding styles. Non-occluding earbuds are generally designed not to form an airtight seal between the ear (or ear canal) and the outer surface 120 of the earbud. By way of contrast, occluding earbuds are generally designed to fit inside of the user's ear canal and form a substantially airtight seal. More detail on different shapes for earbuds is provided below with the discussion of FIGS. 8A-D.

An earbud may function as housing for a speaker, a driver, a circuit board, a microphone, and/or any other electronic part. The earbud may be held close to the ear and connected to a signal source, such as a media player, an amplifier, a radio, a phone, and/or any other device. One or more retention features may be used to retain the one or more electronic parts in particular positions within the housing to ensure the electronic parts are functional. For example, retention features may be user to secure interface circuitry near a user interface component.

Connection 106 may be formed between electroformed three dimensional shaped housing 100 and electronic part 102 during the electroforming process. In an embodiment, layers may be applied during the electroforming process directly to electronic part 102 to form connection 106, such as a contact area formed on a circuit board that allows for completing at least one circuit on a circuit board. Connection 106 may allow for a user interface component to be connected thereto and/or above connection 106, such a button over a contact area.

Connection 106 may allow for providing a control and/or accommodating attachment of a user interface control to the three dimensional shaped housing 100 for the electronic part 102. For example, connection 106 may allow for providing controls, including, but not limited to, the following: volume control, on/off switch, reset, time, media management, stopwatch controls, keys, switches, levers, buttons, and/or any other type of control for a user interface. A button for controlling the electronic part(s) may be integrated in to the three dimensional housing 100 and the button may be electrically connected to electronic part 102. Those with skill in the art will recognize that there are a variety of controls that can be integrated in to the three dimensional shaped housing 100 to work with the connection 106.

In other embodiments, connection 106 may allow for incorporating an output component such as a visual indicator for the status of the device (e.g., an LED). Those with skill in the art will recognize that providing connection 106 between housing 100 and electronic part 102 allows for attachment of a wide variety of components to allow a user to interact with electronic part 102 of a device.

Electronic parts 102 and 104 may be retained within the housing 100 in a particular position with the use of retention features 110, 112, 122, and 124. Retention forming features may be provided on a mandrel and the retention features may be formed on or within housing 100 during the electroforming process. Retention features 110, 112, 122, and 124 may be created to retain electronic parts 102 and 104 after at least a portion of the mandrel is removed. Retention features 110, 112, 122, and 124 may secure electronic parts (e.g., 102 and 104) in a particular position and/or allow for some movement of electronic parts (e.g., 102 and 104). Retention features 110, 112, 122, and 124 may restrict movement of electronic parts (e.g., 102 and 104), such as within a particular portion of three dimensional housing 100 so that the electronic part remains functional for the device.

In an embodiment, drain hole 108 may be provided for removal of a mandrel from three dimensional shaped housing 100. The mandrel may be used for creation of three dimensional shaped housing 100 during an electroforming process, and at least a portion of the mandrel can be removed through the drain hole 108. For example, the mandrel may be made of a material, such as a plastic resin, that can be heated such that at least a portion of the mandrel melts, and at least a portion of the mandrel may seep or drain from the drain hole. In another example, the mandrel may be made of a material, such as aluminum, which can be dissolved in an acid bath, and at least a portion of the mandrel may be dissolved.

After removal of at least a portion of the mandrel, retention features 110, 112, 122, and 124 may secure electronic parts 102 and 104 within housing 100 after removal of the mandrel. In an embodiment, retention features 110, 112, 122, and 124 may secure electronic part 102 and 104 in a particular position or place within three dimensional shaped housing 100 after removal of the mandrel. Assuming, for example, that electronic parts 102 and 104 are speaker components, retention features 110, 112, 122, and 124 can secure speaker components in particular positions to ensure that the speakers perform as expected after removal of the mandrel.

Three dimensional shaped housing 100 may have port 114 and one or more wires 116 may exit or extend out of the port 114. Port 114 may be positioned relative to electronic parts 102 and 104 to allow for receiving any wires and/or cables that extend out of port 114 from electronic parts 102 and 104. In an embodiment, port 114 may be positioned such that wires 116 and/cables extend out from port 114 for use with articulated region of housing 100.

Three dimensional shaped housing 100 may have articulated region 118 that provides strain relief for one or more wires 116. In an embodiment, one or more wires 116 may be covered by a cable and articulated region 118 may have a bellows shape that bends and/or is flexible at the junction between three dimensional shaped housing 100 and the cable to provide strain relief. Articulated region 118 may be any shape that allows for bending of one or more wires 116 exiting port 114. For example, a bellows shaped housing may be a separate piece that is attached or coupled to the three dimensional shaped housing 100 at port 114 to form articulated region 118.

In another embodiment, three dimensional shaped housing 100 may be an electroformed structure that is created with articulated region 118, such that articulated region 118 is an integrated part of housing 100. For example, articulated region 118 of three dimensional shaped housing 100 may have a spring or a bellow shaped texture and the mandrel may have forming feature to create articulated region 118 of three dimensional shaped housing 118 during the electroforming process. Those with skill in the art will recognize that use of articulated region is optional and housing 100 may be created without articulated region 118.

In an embodiment, port 114 may also serve as a drain hole in the electroforming process for three dimensional shaped housing 100 to allow for removal of mandrel. Those with skill in the art will recognize that any hole within housing 100 may optionally serve as a drain hole for removal of mandrel. For example, port 114 may serve a dual purposes as a port within the housing and a drainage hole for removal of the mandrel.

Figure 2B:
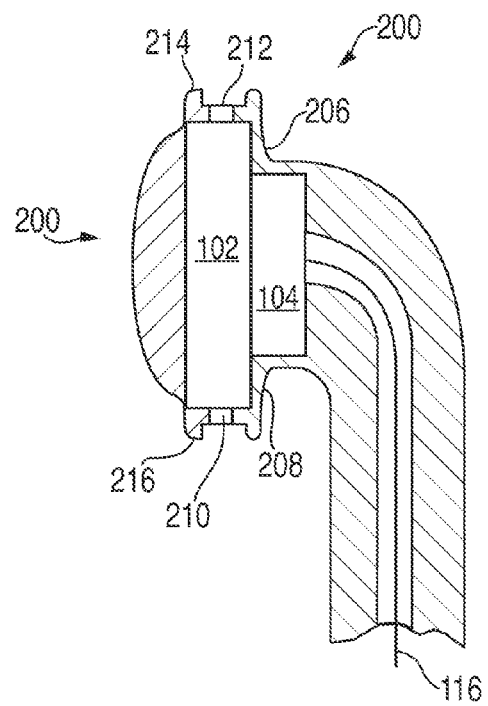
FIG. 2B shows an illustrative cross-sectional view of a mandrel in accordance with embodiments of the invention.

FIG. 2B shows an illustrative cross-sectional view of a mandrel in accordance with embodiments of the invention. Mandrel 200 may encapsulate one or more electronic parts, illustrated with 102 and 104, in one or more materials. For example, electronic parts 102 and 104 may be encapsulated by potting electronic parts in a plastic resin to form mandrel 200. In another example, one or more electronic parts 102 and 104 may be encapsulated in aluminum.

Mandrel 200 may be shaped to create particular features in three dimensional shaped housing 100 and/or to create three dimensional shaped housing 100 that is shaped for performing a particular function. For example, mandrel 200 may be shaped to create three dimensional shaped housing 100 that may be used for an earbud. Mandrel 200 may be shaped to create housing 100 with a shape that substantially encloses one or more electronic parts for the earbud. It may be desirable to create a housing that substantially encloses the one or more electronic parts for a particular device so that there is no need to fasten pieces of a housing together to cover an electronic part. Mandrel 200 may be shaped to create housing 100 that completely encloses one or more electronic parts for an earbud. For example, mandrel 200 may be shaped to surround all of the electronic parts for housing 100 and create resulting housing 100 that fits comfortably within an ear.

Housing 100 may be shaped to ensure the electronics perform optimally, shaped to be aesthetically pleasing, and/or shaped to provide particular functionality. The shape of three dimensional shaped housing 100 created with mandrel 200 for an earbud may allow the three dimensional shaped housing 100 to sit adjacent to an ear canal. In another example, a resulting housing may be created to provide a component of an earbud, such as a microphone, a user interface, or a control, that may be attached to wires extending out from the earbud. For example, a resulting housing may provide a user interface component with controls including, but not limited to, the following: volume control, control for playback and/or recording of media, communication controls, and/or any other type of user interface for electronics.

Mandrel 200 may have retention forming feature 206 to form retention feature 110, retention forming feature 208 to form retention feature 112, retention forming feature 214 to form retention feature 124, and retention forming feature 216 to form retention feature 122 in three dimensional shaped housing 100. Metal layers may be applied to mandrel 200 during the electroforming process to form retention features 110, 112, 122, and 124, in accordance with the shape provided by retention forming features 206, 208, 214, and 216 in the mandrel 200. Retention features 110, 112, 122, and 124 may be any shape, ridge, indentation, groove, and/or any other feature that may secure electronic parts 102 and 104 within three dimensional shaped housing 100 after mandrel 200 is removed.

Mandrel 200 may have drain hole forming feature 210 to form drain hole 108 in a three dimensional shaped housing 100. Drain hole 108 may be used to allow the mandrel 200 to drain or seep out from the three dimensional shaped housing 100. Drain holes may be strategically placed to serve a dual purpose. For example, drain hole 108 may serve as a sound port for an earbud in addition to being used for removal of mandrel.

Mandrel 200 may have connection forming feature 212, such as a gap or a hole, to allow metal to be applied directly to electronic part 102 and form connection 106 between an electronic part 102 and the three dimensional shaped housing 100. The three dimensional shaped housing 100 may be electrically connected to the electronic part 102.

In another embodiment, mandrel 200 may encapsulate an area of electronic part 102 and 204 with a connection 106 (e.g., contact area for incorporating a component) already formed on electronic part 102, and connection forming feature 212 may be a drain hole that remains in resulting housing and is close proximity to the area of electronic part 102 and 204 that allows for connecting a control or a user interface. Continuing with the example, positioning of a hole near the portion of the mandrel covering the area of electronic part 102 and 204 that allows for connection 106 may also ensure that a sufficient amount of the mandrel seeps out leaving the area of electronic part 102 and 204 exposed for attachment of a user interface or control to connection 106.

Embodiments may encapsulate one or more electronic parts 102 and 204 in more than one material to create one or more mandrels. For example, electronic part 102 may be encapsulated in aluminum to form a first mandrel and electronic part 204 may be encapsulated in plastic resin to form a second mandrel. It may be desirable to use different materials to encapsulate a first and second mandrel to allow for removal of the mandrel materials at different times. For example, different materials may melt at different temperatures which may allow for removal of material for one mandrel while another mandrel made from a different material may stay intact. Alternatively, a single mandrel may be formed with multiple materials to control when portions of mandrel are removed. Those with skill in the art will recognize will recognize that a variety of materials, shapes, and configurations for one or more mandrels are available for creating three dimensional shaped housing 100.

Figure 3A:
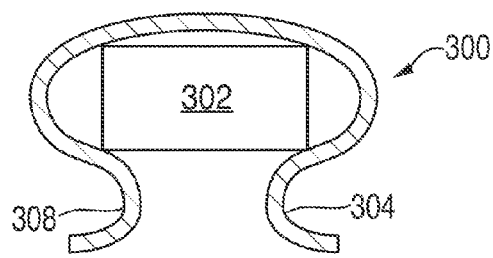
FIG. 3A shows an illustrative cross-sectional view of a mandrel in accordance with an example of an embodiment of the invention.

FIG. 3A shows an illustrative cross-sectional view of a mandrel in accordance with an example of an embodiment of the invention. Mandrel 300 may have electronic part 302 encapsulated within mandrel 300. Mandrel 300 may have retention forming features 304 and 308 that may allow for creation of retention feature in electroformed three dimensional shaped housing 100 that is substantially similar in shape to mandrel 300. The retention features formed with mandrel 300 may secure electronic part 302 within three dimensional shaped housing 306 (described below with FIG. 3B).

Retention features may secure electronic part 302 in a particular position within three dimensional shaped housing 100. For example, electronic part 302 may need to be positioned in a particular place within three dimensional shaped housing 100 to provide functionality, such as a preferred level of sound quality. In another example, the retention feature may hold electronic part 302 in place to limit or reduce the movement of the electronic part within three dimensional shaped housing 100. Retention forming features 304 and 308 may be indentations, crevices, particular shapes, and/or any other features that can be modeled in a material, such as plastic resin or aluminum, and reproduced in three dimensional shaped housing 100 with an electroforming process.

Electronic part 302 may be potted in a plastic resin within mandrel 300. Mandrel 300 may be shaped to have retention forming features 304 and 308 that allow for the creation of retention feature in three dimensional shaped housing 306 to secure electronic part 302 in place after at least a portion of mandrel 300 is removed. For example, a portion of mandrel 300 may be heated such that the material seeps out through drain hole 108, and the retention feature created in three dimensional shaped housing 306 may hold electronic part 302 in place after the portion of mandrel 300 seeps out.

Figure 3B:
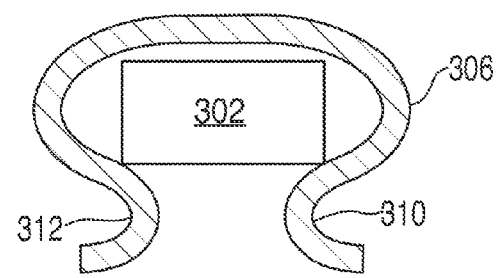
FIG. 3B shows an illustrative cross-sectional view of an electroformed housing in accordance with an example of an embodiment of the invention.

FIG. 3B shows an illustrative view of an electroformed housing with a retention feature in accordance with an example of an embodiment of the invention. Three dimensional shaped housing 306 may be created with mandrel 300. Electronic part 302 may remain in place after the removal of the mandrel 300 from three dimensional shaped housing 306 with retention features 310 and 312. As shown in FIG. 3A, retention forming features 304 and 308 provide for the creation of three dimensional shaped housing 306 with retention feature 310 that secures electronic part 302 in place.

Retention features 310 and 312 may cause three dimensional shaped housing 306 to have a shape that partially resembles the electronic part within to accommodate the electronic part 302 and ensure that electronic part 302 stays in place and/or allows for movement of electronic part 302 permitted to maintain optimal performance of electronic part 302. For example, retention features 310 and 312 may have a shape to support the corners of electronic part 302 and hold or secure electronic part 302 in place with limited movement, and as a result portions of housing 300 may have a shape to resemble a portion of electronic part 302 within. In another example, housing 100 supports electronic part 102 with retention features 110, 112, 122, and 124 at each corner of the electronic part 102, and housing 100 partially resembles or takes the shape of the electronic part 102 within.

Figure 4:
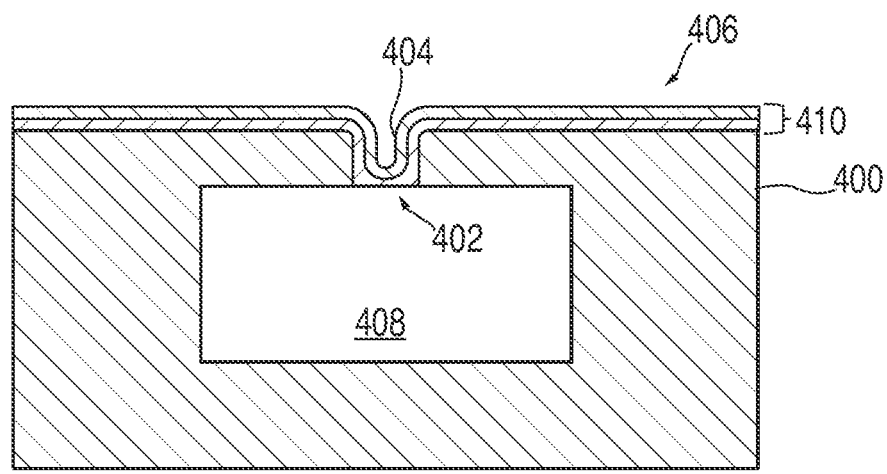
FIG. 4 shows illustrative cross-sectional view of an electroformed housing in accordance with an example of an embodiment of the invention.

FIG. 4 shows illustrative cross-sectional view of an electroformed housing in accordance with an example of an embodiment of the invention. Mandrel 400 may have connection forming feature 402, such as an opening, that allows for the creation of connection 404 between three dimensional shaped housing 406 and electronic part 408. Connection forming feature 402 of mandrel 400 may be an opening, a gap, or a hole in mandrel 400 that exposes electronic part 408 during the electroforming process. Connection forming feature 402 may be a size and a shape that allows for electroforming metal layers 410 to form connection 404 with the exposed electronic part 408. Electroforming metal layers 410 may be applied to the surface of exposed electronic part 408. Connection 404 may be used to provide an electrical pathway to electronic part 408 or contact area on electronic part 408. In some embodiments, a user interface component for electronic part 408 may be coupled to connection 404.

Figure 5:
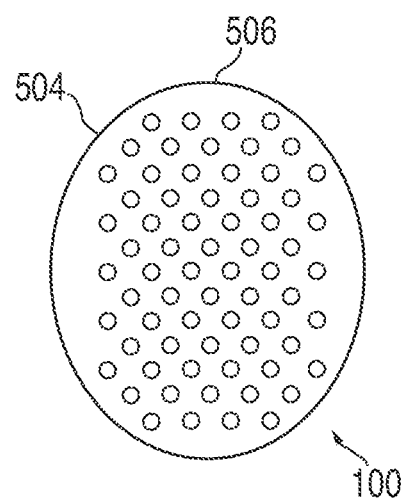
FIG. 5 shows an illustrative view of an electroformed housing in accordance with an example of an embodiment of the invention.

FIG. 5 shows an illustrative view of an electroformed housing in accordance with an example of an embodiment of the invention. Electroformed housing 100 may have plurality of holes 504 therein for permitting sound waves to pass through. In one or more embodiments, a photomask and/or any other type of film may be applied to three dimensional shaped electroformed housing 100, such as an earbud housing illustrated in FIG. 5, and laser cutting or etching may be performed to create plurality of holes 504 in housing 100 to form sound region 506 for the earbud.

In another embodiment, a photomask or a film may be applied to mandrel 200 that has a particular pattern to create a sound region and layers of a material may be applied to mandrel 200 with photomask to create housing 100. For example, photomask may have a pattern to form a plurality of holes in housing 100. Continuing with the example, the photomask may be removed such that plurality of holes 504 remain on housing 100 in the pattern provided by the photomask to form sound region 506.

Figure 6A:
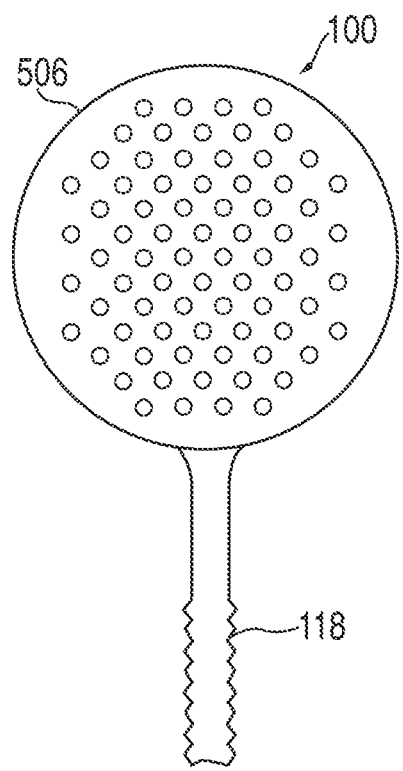
FIG. 6A shows a side view of an electroformed housing in accordance with an example of an embodiment of the invention.

FIG. 6A shows a side view of an electroformed housing in accordance with an example of an embodiment of the invention. FIG. 6A shows a side view of an electroformed housing 100 for an earbud. As illustrated, electroformed housing 100 may be created as a single piece with no seams. Electroformed housing 100 may have an integrated sound region 506 and articulated region 118.

Figure 6B:
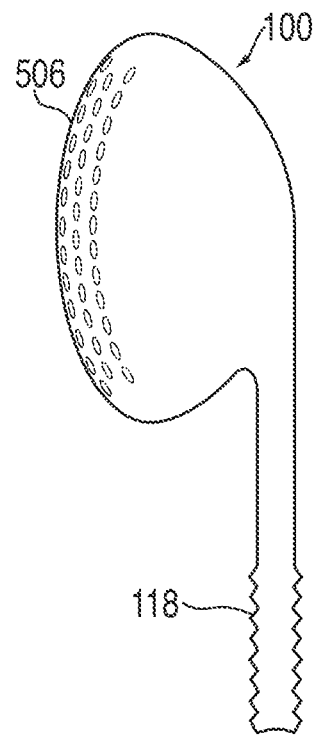
FIG. 6B shows a top plan view of an electroformed housing in accordance with an example of an embodiment of the invention.

FIG. 6B shows a top plan view of an electroformed housing in accordance with an example of an embodiment of the invention. FIG. 6B shows a top plan view of an electroformed housing 100 for an earbud. As illustrated, electroformed housing 100 may be created as a single piece with no seams. Electroformed housing 100 may have an integrated sound region 506 and articulated region 118. Those with skill in the art will recognize that there are an infinite number of patterns available for creating plurality of holes for sound region 506. For example, as shown in FIG. 6B plurality of holes can be formed in concentric circles on electroformed housing 100. In other embodiments, plurality of holes for sound region 506 can have a seemingly random pattern, as depicted in FIGS. 5 and 6A.

FIG. 7 shows an illustrative cross-sectional view of a mandrel and an electroformed housing in accordance with an example of an embodiment of the invention. Mandrel 700 may be shaped to have texture forming features 702 to enable the creation of texture 706 on three dimensional shaped housing 704 as shown in FIG. 7. Three dimensional shaped housing 704 may have texture 706 to create an integrated articulated region in three dimensional shaped housing 704. For example, texture 706 could create a spring or a bellow shaped articulated region 118 on the surface of three dimensional shaped housing 704.

FIGS. 8A-D show illustrative isometric views of electroformed housings in accordance with embodiments of the invention. Each of housings 800, 804, 806, and 808 can encompass different types of electronics. FIG. 8A shows an illustrative isometric view of an electroformed housing in accordance with embodiments of the invention. Over-the ear earbud 800 is an example of an electroformed housing for electronic parts that can be created with an electroforming process. Over-the ear earbud 800 can be non-occluding or occluding, and over-the ear earbud 800 can be held and/or sit adjacent to the ear with the curved region 802 of the earbud 800 that can fit over the ear.

FIG. 8B shows an illustrative isometric view of an electroformed housings in accordance with embodiments of the invention. Occluding earbud 804 and non-occluding earbud 806 are examples of electroformed housings for electronic parts. Occluding earbud 804 can be designed to fit inside of the user's ear canal and form a substantially airtight seal.

FIG. 8C shows an illustrative isometric view of an electroformed housings in accordance with embodiments of the invention. Non-occluding earbud 806 can be designed not to form an airtight seal between the ear (or ear canal) and the outer surface of the earbud. Non-occluding earbud 806 can be created to perform a particular function optimally and/or be aesthetically pleasing.

FIG. 8D shows an illustrative isometric view of an electroformed housing in accordance with embodiments of the invention. Electroformed housing for electronic parts 808 may be a component and/or accessory of an earbud that houses electronic parts, such as a microphone or volume control.

Figure 9A:
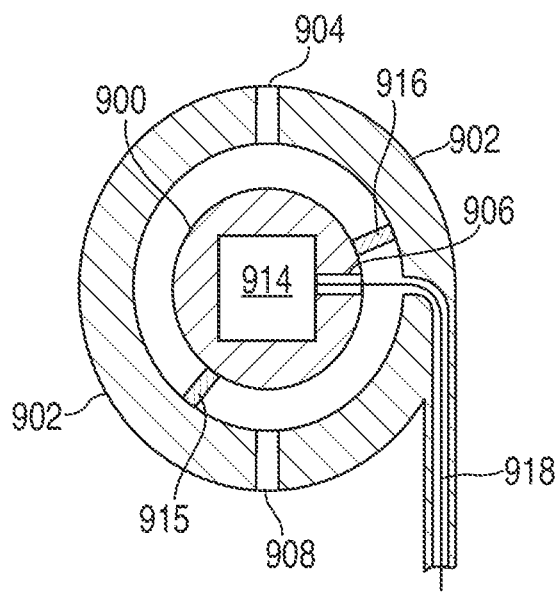
FIG. 9A shows an illustrative cross-sectional view of multiple mandrels in accordance with some embodiments of the invention.

FIG. 9A shows an illustrative cross-sectional view of multiple mandrels in accordance with some embodiments of the invention. One or more mandrels can be used to create an electroformed housing as illustrated with FIG. 9A. A first mandrel 900 can be combined with a second mandrel 902 to create electroformed housing in FIG. 9B, discussed in more detail below. The first mandrel 900 can be combined with the second mandrel 902 to form the electroformed housing in a variety of ways including, but not limited to, the following: the first mandrel 900 can be placed inside the second mandrel 902, the first mandrel 900 can be coupled to the second mandrel 902, and/or any other method for combining mandrels to form an electroformed housing.

In FIG. 9A, the first mandrel 900 sits inside the second mandrel 902, and mandrel 900 and mandrel 902 are shown coupled together to maintain their positions relative to each other during the electroforming process, as shown with coupling portions 915 and 916 to couple mandrels 900 and 902 together. The coupling portions 915 and 916 can be formed from any suitable material to hold mandrels 900 and 902 in place during the electroforming process.

First mandrel 900 retains electronic part 914 and provides opening 906 with wire 918 to electronic part 914 extending out from opening 906. Metal layers may be applied to the first mandrel 900 during the electroforming process through openings 904 and 908 in the second mandrel 902. Each of the mandrels (e.g. 900 and 902) can have drain holes (e.g. openings 906 and 908) to allow for creation of an electroformed housing with drain holes for removal of the mandrels.

Figure 9B:
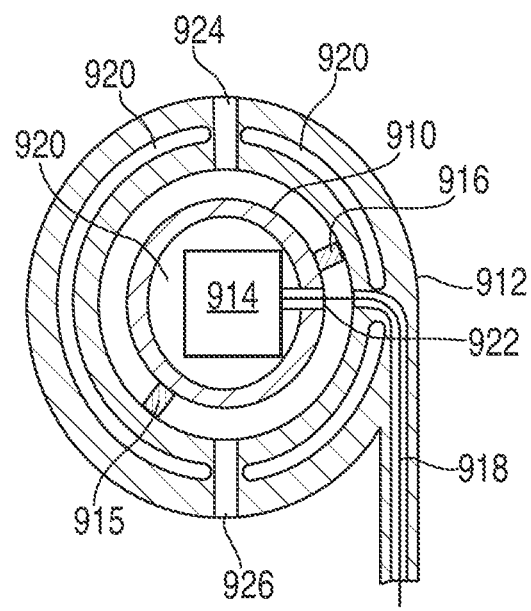
FIG. 9B shows an illustrative cross-sectional view of an electroformed housing in accordance with some embodiments of the invention.

FIG. 9B shows an illustrative cross-sectional view of an electroformed housing in accordance with some embodiments of the invention. As shown in FIG. 9B, a first three dimensional shaped housing 910 and a second three dimensional shaped housing 912 may be created during the electroforming process. Metal layers may be applied to mandrels 900 and 902 and coupling portions 915 and 916. Mandrels 900 and 902 may be removed from first housing 912 and second housing 910, as illustrated with regions 920 of empty space in each of the housings. Electronic part 914 is secured within housing 910, and port 922 may be formed from opening 906 in mandrel 900 with wire 918 extending out from port 922.

The first mandrel 900 and second mandrel 902 may be made of different materials and removed with different methods. For example, the first mandrel 900 may be made from plastic resin and the second mandrel 902 may be formed from aluminum, and each mandrel may be removed with a different process (e.g. acid bath, heating, etc.). Mandrels 900 and 902 may be removed through openings 922, 924, and 926 that may serve as drain holes. Optionally, the coupling portions 915 and 916 may be made from a similar material as at least one mandrel and be removed. In FIG. 9B, coupling portions 915 and 916 remain within the electroformed housing formed from the mandrels 900 and 902.

Figure 10A:
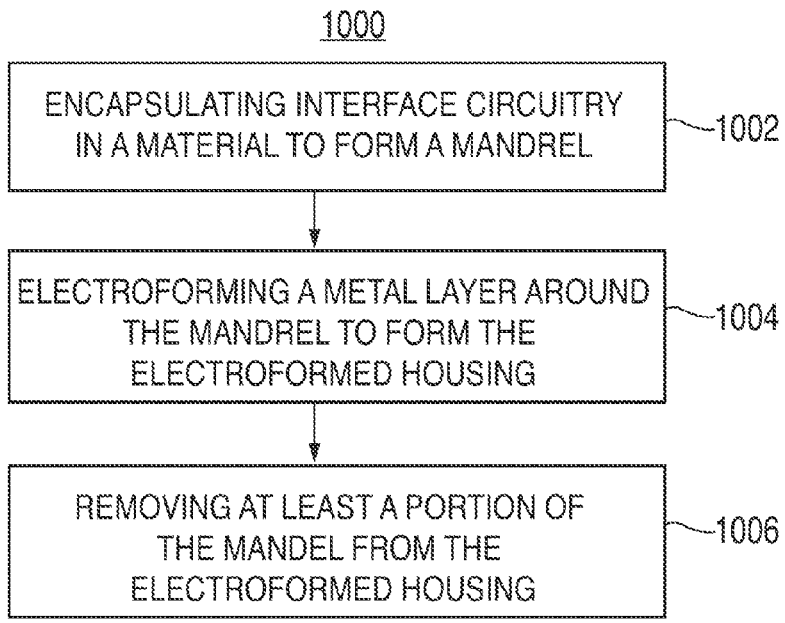
FIG. 10A is a flowchart of an illustrative process for electroforming a housing in accordance with some embodiments of the invention.

FIG. 10A is a flowchart of an illustrative process for electroforming a housing in accordance with some embodiments of the invention. Beginning at step 1002, electronic circuitry may be encapsulated in a material to form a mandrel 1002. For example, the electronic parts may be encapsulated by potting the one or more electronic parts in a plastic resin. The electronic parts may be encapsulated in a plastic resin using, for example, injection molding, insert molding, compression molding, or other suitable molding technique. The mandrel may have a three dimensional shape that encompasses one or more electronic parts. The mandrel may be shaped to create housing for a particular function. In an embodiment, the mandrel may have a three dimensional non-rectilinear shape to produce electroformed housing for an earbud. The mandrel may have retention forming features to create retention features in the three dimensional shaped housing based on the retention forming features. For example, the retention features may hold an electronic part in particular position within the housing.

At step 1004, a metal layer may be electroformed around the mandrel to form electroformed housing. The metal layers may resemble the three dimensional shape of the mandrel to form an enclosure for the one or more electronic parts, as described in connection with the description accompanying FIG. 1F. The retention features may be formed in the housing resembling the retention forming features in the mandrel after application of the metal layers.

During the electroforming process, the metal layer may be electroformed around the mandrel, such that the metal seeps through a hole or a gap in the mandrel to enable the three dimensional shaped housing to be electrically connected to at least one electronic part in an embodiment. The connection between the three dimensional shaped housing and the electronic part may allow for integration of a button for controlling electronics integrated into the three dimensional shaped housing. In one or more embodiments, a bellows shaped housing may be coupled to the three dimensional shaped housing to form an articulated region in the electroformed housing.

At step 1006, at least a portion of the mandrel may be removed from the electroformed housing. After a portion of the mandrel is removed, electronic circuitry may be retained within electroformed housing. For example, the mandrel may be heated to remove a portion of the mandrel by allowing the melted material of the mandrel to drain. In another example, the mandrel may be removed by submersing the three dimensional shaped housing in an acid bath. In some embodiments, substantially all of the mandrel can be removed. Retention features may secure an electronic part after a portion of the mandrel is removed.

Figure 10B:
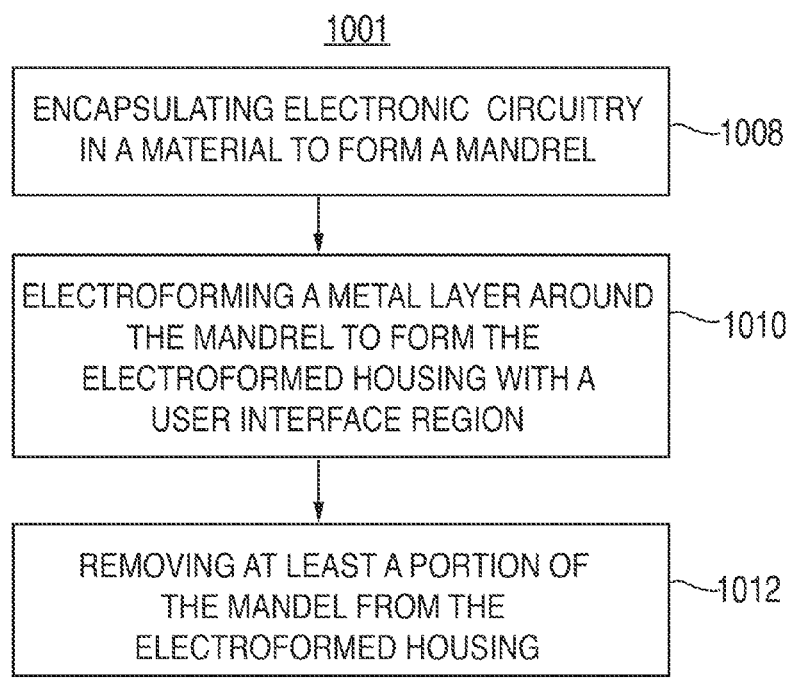
FIG. 10B is a flowchart of an illustrative process for electroforming a housing in accordance with some embodiments of the invention.

FIG. 10B is a flowchart of an illustrative process for electroforming a housing in accordance with some embodiments of the invention. Beginning at step 1008, interface circuitry is encapsulated in a material to form a mandrel. The mandrel encompasses the interface circuitry and has a first shape. The interface circuitry may be encapsulated in plastic resin using injection molding, insert molding, and compression molding. The mandrel may be shaped to create housing for a particular function. In an embodiment, the mandrel may have a hexahedral shape for a keyboard housing.

The mandrel may be shaped to have retention forming features to create retention features in electroformed housing to retain interface circuitry. For example, the resulting retention features may hold interface circuitry substantially adjacent to a user interface region to allow a user to initiate input events that can be processed using interface circuitry.

At step 1010, a metal layer is electroformed around the mandrel to form the electroformed housing with a user interface region. The electroformed housing encompasses the mandrel and has a second shape that resembles the first shape.

During the electroforming process, the metal layer may be electroformed around the mandrel such that the metal seeps through a hole or a gap in the mandrel to enable the three dimensional shaped housing to be electrically connected to at least one electronic part of the interface circuitry. The resulting connection between the electroformed housing and the electronic part may allow for integration of a user interface control for initiating input events.

In an embodiment, one or more user interface features in the user interface region may be created in electroformed housing during the electroforming process based on one or more user interface forming features provided with the mandrel shape. The user interface region in the resulting electroformed housing may have input controls and/or components formed in the electroformed housing based on the user interface forming features.

At step 1012, at least a portion of the mandrel is removed from the electroformed housing. The mandrel material may be removed by heating it to cause the material to flow from the electroformed housing. Alternatively, the material, such as aluminum, can be removed by submersing the electroformed housing in an acid bath to remove the material. After the portion of the mandrel is removed, the resulting electroformed housing is self-supporting and retains the second shape. In particular, the interface circuitry is retained within the electroformed housing in a position substantially adjacent to the user interface region.

Figure 11A:
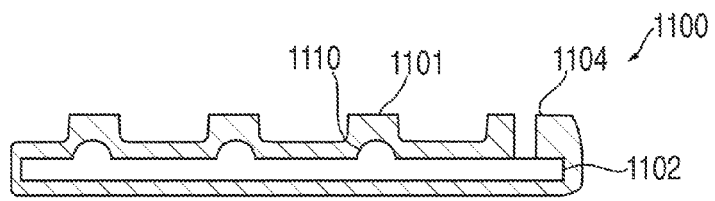
FIG. 11A shows an illustrative cross-sectional view of a mandrel in accordance with some embodiments of the invention.

FIG. 11A shows an illustrative cross-sectional view of a mandrel in accordance with some embodiments of the invention. Specifically, FIG. 11A shows an illustrative view of mandrel 1100 for a keyboard. Mandrel 1100 encapsulates one or more electronic parts 1102 and 1110 in a material, such as a plastic resin. Mandrel 1100 may have a particular three dimensional shape to accommodate keyboard electronics and ensure that the resulting keyboard created with mandrel 1100 is shaped for the intended function of becoming a keyboard.

Mandrel 1100 may have a shape for creating a particular type of keyboard with a particular user interface region, such as a particular number of buttons. For example, mandrel may be shaped to create a keyboard for a particular language, such as English, Greek, Chinese, or any other language. In some embodiments, mandrel 1100 may have a shape to create an ergonomically correct keyboard, a numeric keyboard, a particular sized keyboard, a wireless keyboard, and/or any other input device designed for a particular function.

Mandrel 1100 may have retention forming features 208 to accommodate the keyboard electronics. Retention forming features 208 may be used to create retention features 310 in a keyboard housing to retain electronic parts 1102, such as a circuit board or other interface circuitry, in a particular position and/or reduce movement of electronic parts 1102 within the keyboard. For example, retention forming features 208 may secure interface circuitry in place to ensure that when a user interacts with the keyboard to initiate a user input event, the user input event is processed by the interface circuitry. Electronics for a keyboard, may include, but are not limited to, the following: circuit board, wireless transmitter and receiver, interface circuitry, switches, and/or any other keyboard electronics.

The resulting retention features 310 may allow for an amount of movement of interface circuitry (e.g., a circuit board) that will not interfere with optimal performance of the keyboard. For example, retention features 310 may ensure that each switch (e.g., switch 1110) or contact area on circuit board 1102 remains underneath each user input component of user interface region in electroformed housing. Continuing with the example, retention feature 310 may retain switch 1110 underneath a corresponding button on the user interface region of a keyboard, so that the button and corresponding switch 1110 is functional.

As shown in FIG. 11A, mandrel 1100 encapsulates electronic part 1102, such as a circuit board, with switch 1110 for a keyboard. Mandrel 1100 has connection forming feature 1104 to allow for connecting a button, a control, or a user interface component to the electronic part 1102. In an embodiment, connection forming feature 1104 is a hole or a gap in mandrel 1100 to allow for an electroformed metal layer to seep through connection forming feature 1104 (e.g., opening) to allow the keyboard housing to be electrically connected (e.g., create a contact area) to the electronic part 1102.

In an embodiment, connection forming feature 1104 may serve dual purposes to provide an area for creating a contact area as well as provide a drain hole for removal of mandrel 1100 from housing. A film may be place over a portion of mandrel 1100 at opening for connection forming feature 1104 and the film may be removed to expose the mandrel 1100 to ensure mandrel can be heated and removed from within housing.

Mandrel 1100 may have user interface forming feature 1101 to create an integrated user interface control or component in a user interface region of a resulting keyboard housing created with mandrel 1100. User interface forming feature 1101 of mandrel 1100 may allow for creation of an integrated user interface component in resulting keyboard housing. For example, user interface forming feature 1101 may allow for creation of an integrated user input control, such as a button, in the electroformed housing. User interface forming feature 1101 may have a particular shape to allow for creation of interface features in electroformed keyboard housing during the electroforming process. For example, user interface forming feature 1101 may be shaped to be a user interface component, such as a button, and layers of metal on user interface forming feature 1101 may create the user interface component.

In another embodiment, user interface forming feature 1101 may allow for creation of an output display or component for a user interface. In this case, user interface forming feature 1101 may be a mask applied to mandrel material that can later be removed to expose an output user interface component below. For example, a mask, a film, or other removable covering may be applied to mandrel prior to an electroforming process and removed after formation of electroformed housing to expose an output electronic part below. Continuing with the example, output electronic part may be an LED, a display screen, and/or any other electronic part for providing output.

User interface forming feature 1101 of mandrel 1100 may be positioned substantially adjacent to corresponding interface circuitry to process input events for the resulting integrated input component in keyboard housing. For example, encapsulated electronic part 1102 may have one or more switches (e.g., 1110) or electrical contacts that can be positioned beneath user interface forming feature 1101 to ensure that the switches or electrical contacts are underneath the resulting integrated input component or controls, e.g., buttons, in electroformed housing.

In an embodiment, mandrel 1100 may have a drain hole in close proximity to a switch or a contact area on circuit board 1102 to ensure that a sufficient amount of mandrel 1100 is removed from a contact area on the circuit board 1102. For example, a portion of mandrel 1100 may be removed or drained from housing such that a contact area created with connection forming feature 1104 on circuit board 1102 is functional when a button is secured to the housing above.

Figure 11B:
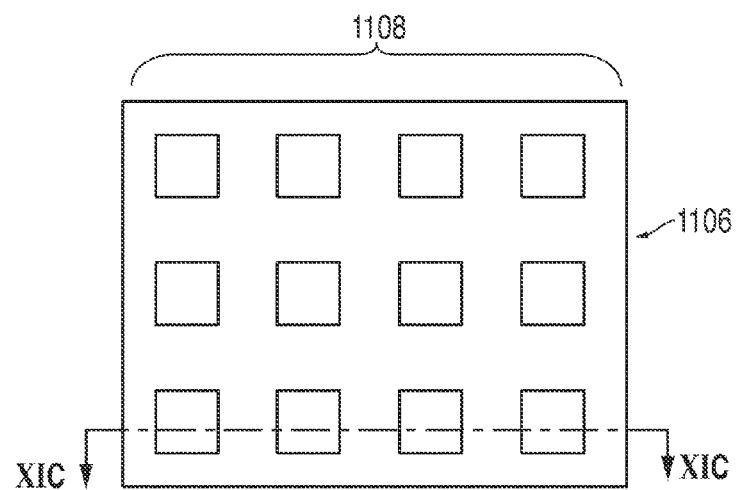
FIG. 11B shows an illustrative top view of an electroformed housing in accordance with some embodiments of the invention.

FIG. 11B shows an illustrative top view of an electroformed housing in accordance with some embodiments of the invention. FIG. 11B illustrates a top view of electroformed keyboard 1106 formed using mandrel 1100 of FIG. 11A. In an electroforming process, layers of the material may be deposited onto mandrel 1100 via a chemical bath. The material is deposited with sufficient number of layers and thickness to create a self-supporting structure for a keyboard, such that at least a portion of mandrel 1100 may be removed from the three dimensional shaped housing and the structure for the keyboard may remain intact.

At least a portion of mandrel 1100 may be removed or drained leaving the resulting self-supporting electroformed keyboard 1106. For example, a portion of mandrel 1100 may be removed to ensure that the buttons of the keyboard are functional. In another embodiment, electronic parts 1102, such as a circuit board may remain at least partially potted in a material. For example, a particular electronic part may perform optimally if it is cushioned in a mandrel material or remains isolated from other electronic parts in a material.

Electroformed keyboard 1106 may take a shape resembling mandrel 1100 or a shape substantially similar to mandrel 1100. In an embodiment, electroformed keyboard 1106 may have a substantially rectilinear shape. Electroformed keyboard 1106 may have user interface region 1108 with a single button, a single user interface input, a plurality of user interface inputs, or a plurality of buttons or keys, as illustrated. Plurality of buttons of user interface region 1108 may be labeled with alphanumeric characters and/or symbols. Plurality of buttons may be engraved or printed with alphanumeric characters and/or symbols.

Interface circuitry may be positioned substantially adjacent to user interface region 1108 in order to process user initiated input events. For example, beneath each button from the plurality of buttons of user interface region 1108 may be switches or electrical contacts that allow a circuit on the circuit board to be completed when an actuator is pressed and/or touched by a user. A processor of interface circuitry can receive user inputs and drive output component. For example, a key may be pressed on the keyboard and interface circuitry may insure that the selected key is displayed on a display.

Figure 11C:
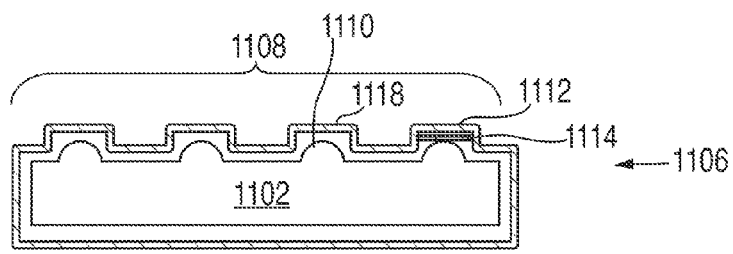
FIG. 11C shows an illustrative cross-sectional view of an electroformed housing in FIG. 11B taken along line XIC-XIC in accordance with some embodiments of the invention.

FIG. 11C shows an illustrative cross-sectional view of an electroformed housing in FIG. 11B taken along line XIC-XIC in accordance with some embodiments of the invention. Cross-section of housing 1106 shows button 1112 from the plurality of buttons of user interface region 1108. A switch 1114 for circuit board 1102 is provided underneath button 1112. Upon touch or depression of button 1112, the switch 1114 may complete a circuit on the circuit board 1102, and device circuitry may process the user input event.

Button 1112 may be fastened to user interface region 1108 of electroformed keyboard housing 1106 at a connection 1114 formed with connection forming feature 1104 of mandrel 1100. In another embodiment, interface region 1108 of electroformed housing 1106 may have an integrated user interface control component 1118 on the surface of electroformed housing created with user interface forming feature 1101 of mandrel 1100. Interface circuitry, such as circuit board 1102, may be positioned substantially adjacent to the user interface region 1108 to capture and process user initiated events using user interface of a device.

As shown in FIG. 11C, mandrel 1100 may be substantially removed or drained from keyboard 1106 to ensure that material from mandrel 1100 does not interfere with optimal performance of the keyboard 1106. In another embodiment, at least a portion of mandrel 1100 may remain within electroformed keyboard 1106 housing.

Figure 11D:
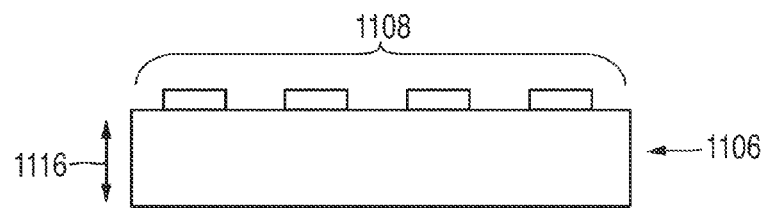
FIG. 11D shows an illustrative side view of an electroformed housing in FIG. 11B.

FIG. 11D shows an illustrative side view of electroformed housing in FIG. 11B. FIG. 11D shows electroformed keyboard 1106 with plurality of buttons from user interface region 1108 from the side. Keyboard 1106 may have a thickness 1116 to accommodate keyboard electronics and/or ports for connecting one or more accessories or devices.

Figure 12:
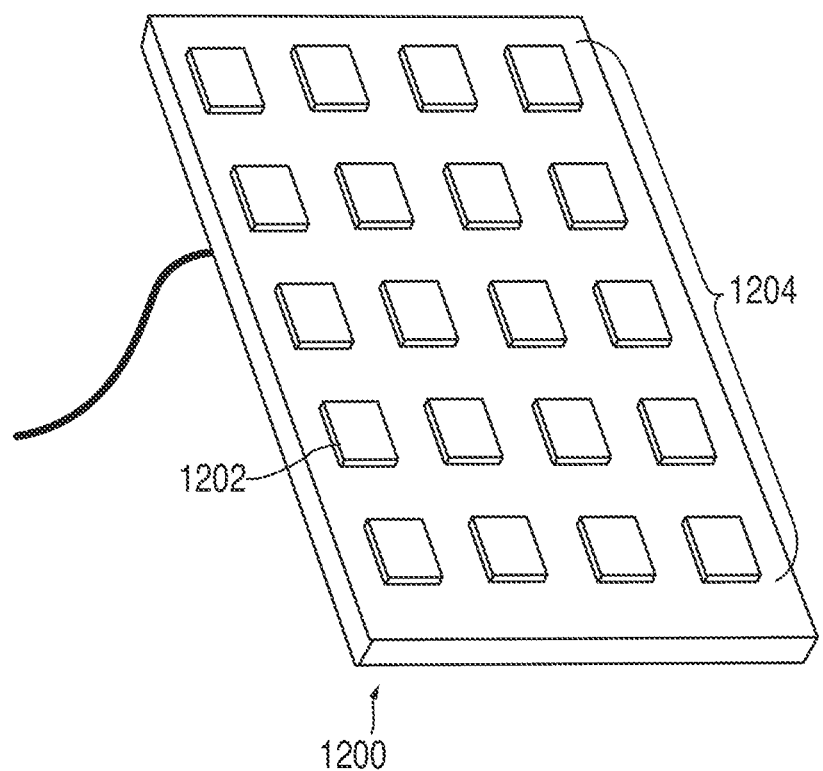
FIG. 12 shows an isometric view of an electroformed housing in accordance with an example of an embodiment of the invention.

FIG. 12 shows an isometric view of an electroformed housing in accordance with an example of an embodiment of the invention. A top view of an electroformed housing 1200 for a keyboard is illustrated. As shown, electroformed housing 1200 is formed with no seams. A plurality of buttons 1202 are integrated in to form interface region 1204 for electroformed housing 1200.

In one or more embodiments, electroformed housing may serve as a housing for any portable, mobile, hand-held, or miniature mobile electronic device. Miniature devices may have a form factor that is smaller than a hand held device, such as an iPod™ Shuffle available by Apple Inc. of Cupertino, Calif. Illustrative miniature devices may be incorporated into various objects that include, but are not limited to, the following: watches, rings, necklaces, belts, headsets, shoe accessories, virtual reality devices, other wearable electronics, sports or fitness equipment accessories, key chains, or any combination thereof. Alternatively, electronic device may not be portable at all.

While there have been described electroformed housings, earbuds, keyboards, devices, and systems and methods for the producing earbuds, keyboards, devices, and housings thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for making an electroformed housing for an electronic device, the method comprising:
    forming a mandrel by encapsulating an electronic part in a mandrel material such that the mandrel material encompasses the electronic part, the mandrel having a first shape and having a retention forming feature;
    forming the electroformed housing by electroforming a metal layer around the mandrel such that the electronic part is within the electroformed housing and the retention forming feature forms a retention feature that defines a position of the electronic part within the electroformed housing, the electroformed housing encompassing the mandrel and having a second shape corresponding to the first shape; and
    removing at least a portion of the mandrel material from the electroformed housing such that, after the at least a portion of the mandrel material is removed, the electronic part is secured within the electroformed housing by the retention feature and the electroformed housing retains the second shape.

2. The method of claim 1, wherein removing the at least a portion of the mandrel material comprises:
    heating the mandrel material to cause the mandrel material to flow from the electroformed housing.

3. The method of claim 1, wherein the mandrel material is aluminum and wherein the removing comprises:
    submersing the electroformed housing in an acid bath to remove the mandrel material.

4. The method of claim 1, wherein the encapsulating further comprises:
    using at least one of injection molding, insert molding, and compression molding to encompass the electronic part.

5. The method of claim 1, wherein the electronic part includes interface circuitry, wherein the position of the electronic part arranges the interface circuitry adjacent to a user interface region of the electroformed housing.

6. The method of claim 5, wherein the mandrel comprises one or more user interface forming features, and wherein the electroforming further comprises:
    forming one or more user interface features in the user interface region based on the one or more user interface forming features.

7. The method of claim 1, wherein the retention feature reduces movement of the electronic part within the electroformed housing after removing the at least a portion of the mandrel material from the electroformed housing.

8. The method of claim 1, wherein the retention feature is attachable to an additional electronic component.

9. The method of claim 1, wherein the electroformed housing includes a drain hole, wherein removing the at least a portion of the mandrel material comprises causing the mandrel material to flow through the drain hole.

10. The method of claim 9, wherein the mandrel includes a drain hole forming feature that forms the drain hole.

11. A method of forming a housing for an electronic device, the method comprising:
    forming a mandrel by encasing an electronic part within a mandrel material, the mandrel having an exterior surface defining a mandrel shape, the mandrel including a retention forming feature;
    creating the housing by electroforming a layer over the exterior surface of the mandrel such that the electronic part is within the housing and the retention forming feature forms a retention feature that defines a position of the electronic part within the housing, the housing having a housing shape corresponding to the mandrel shape; and
    removing a portion of the mandrel material from the housing such that, after the portion of the mandrel material is removed, the housing retains the housing shape and the electronic part is secured within the housing by the retention feature.

12. The method of claim 11, wherein removing the portion of the mandrel material includes removing substantially all the mandrel material from the housing.

13. The method of claim 11, wherein removing the portion of the mandrel material comprises:
    causing the mandrel material to flow out of the housing.

14. The method of claim 11, wherein the electronic part is an user interface component, wherein the retention feature positions the interface component adjacent to a user interface region of the housing.

15. The method of claim 14, wherein the housing corresponds to an earpiece housing and the user interface component includes a speaker.

16. The method of claim 14, wherein the housing corresponds to a keyboard housing and the user interface component includes a switch.

17. The method of claim 11, wherein electroforming the layer over the exterior surface of the mandrel comprises electroforming multiple layers.

* * * * *